US007584697B2

(12) United States Patent
Yamauchi et al.

(10) Patent No.: US 7,584,697 B2
(45) Date of Patent: Sep. 8, 2009

(54) ISOSTATIC PRESS

(75) Inventors: Takanori Yamauchi, Takasago (JP); Yasuhide Miyashita, Takasago (JP)

(73) Assignee: Kabushiki Kaisha Kobe Seiko Sho (Kobe Steel, Ltd.), Kobe-shi (JP)

( * ) Notice: Subject to any disclaimer, the term of this patent is extended or adjusted under 35 U.S.C. 154(b) by 0 days.

(21) Appl. No.: 11/734,431

(22) Filed: Apr. 12, 2007

(65) Prior Publication Data

US 2007/0266866 A1 Nov. 22, 2007

(30) Foreign Application Priority Data

May 22, 2006 (JP) ............................. 2006-141903

(51) Int. Cl.
*B30B 15/34* (2006.01)
*B29C 35/04* (2006.01)

(52) U.S. Cl. ................ 100/305; 100/269.01; 425/405.2

(58) Field of Classification Search ................. 100/323, 100/269.01, 269.05, 269.14, 92, 305; 425/405.2; 419/42, 49, 68

See application file for complete search history.

(56) References Cited

FOREIGN PATENT DOCUMENTS

| | | | | |
|---|---|---|---|---|
| JP | 61-124503 | | | 6/1986 |
| JP | 61-126998 | | | 6/1986 |
| JP | 61165297 | A | * | 7/1986 |
| JP | 4-84696 | | * | 3/1992 |
| JP | 7-61238 | | | 7/1995 |
| JP | 2006-61961 | | | 3/2006 |
| KR | 1993-0002023 | | | 2/1993 |

* cited by examiner

*Primary Examiner*—Jimmy T Nguyen
(74) *Attorney, Agent, or Firm*—Oblon, Spivak, McClelland, Maier & Neustadt, P.C.

(57) ABSTRACT

An isostatic press includes a heat insulator that forms a working zone which contains a workpiece, a high pressure vessel that covers the heat insulator, a heating unit that heats the high pressure vessel, and a pressure medium supplying device that can supply an interior of the high pressure vessel with the pressure medium A pressure medium introducing space communicates with the working zone via a communication hole formed on a top portion of the heat insulator. The pressure medium supplying device communicates with the pressure medium introducing space via a pressure medium introducing opening formed on a bottom portion of the high pressure vessel.

3 Claims, 3 Drawing Sheets

ISOSTATIC PRESS

BACKGROUND OF THE INVENTION

1. Field of the Invention

The present invention relates to an isostatic press.

2. Description of the Related Art

The pressure is presently used for food processing, sterilization of foods, and the like in addition to for isostatic pressing applied to powders made of metal, ceramic, or the like, and there is carried out a process which synergistically applies heat along with the pressure in this case.

As a device which applies the pressure and the heat to a workpiece in this manner, Japanese Patent Laid-Open No. S61(1986)-124503 discloses a warm isostatic press which contains a workpiece inside a high pressure vessel, and introduces a heated pressure medium, thereby applying pressure and heat to the workpiece by means of the pressure medium.

However, in this warm isostatic press, a circulation passage of the pressure medium is not formed within the high pressure vessel. As a result, even if the heated and pressurized pressure medium is introduced into the high pressure vessel, depending on positions of an inlet opening and an outlet opening of the pressure medium formed on the high pressure vessel, the pressure medium which has flown in through the inlet opening may flow out from the outlet opening without circulating within the high pressure vessel, which prevents a desired heating effect from being attained. Moreover, there is no heat insulating material within the high pressure vessel, and there thus poses a problem that the pressure medium exchange heat with the high pressure vessel, resulting in a decrease of the temperature of the pressure medium.

To address the above problem, there is proposed a warm isostatic press which is equipped with a tubular bucket which can contain a workpiece in a high pressure vessel, thereby forming a circulation passage of a pressure medium within the high pressure vessel by means of the bucket (Japanese Patent Laid-Open No. S61(1986)-126998).

Though this warm isostatic press provides a better heating effect than the warm isostatic press disclosed in Japanese Patent Laid-Open No. S61(1986)-124503 for heating, there is no heat insulating member inside the high pressure vessel, the heat of the pressure medium is thus released to the outside of the high pressure vessel through the high pressure vessel, and there poses a problem that it is difficult to maintain the pressure medium within the high pressure vessel at a desired temperature. Moreover, since the pressure medium at a low temperature is in contact with the workpiece while circulating during the pressurizing, there is such a problem that the temperature accuracy decreases.

To solve the above problems, Japanese Published examined application No. H7(1995)-61238 discloses a high pressure processing device which, by forming a working zone for storing a workpiece using a heat insulating structure, and by providing the heat insulating structure within a high pressure vessel to restrain a releasing heat of a pressure medium which flowing into the working zone to the outside of the high pressure vessel. Moreover, in the high pressure processing device, when the pressure medium pressurized by a pump is pressure-fed to the high pressure vessel, the pressure medium is heated via a heating device provided outside to prevent the temperature from decreasing in the process of pressurizing, resulting in an increase in the temperature accuracy.

However, in the high pressure processing device according to Japanese Published examined application No. H7(1995)-61238, there is provided a configuration where the pressure medium is flown inside the heat insulating structure storing the workpiece, is flown upward inside the heat insulating structure, and is then flown out through a slit formed on a top end portion of the heat insulator into a space between the heat insulating structure and the high pressure vessel, the pressure medium, which is at a low temperature due to the heat exchange with the workpiece, thus comes into contact with the high pressure vessel which has a high heat capacity, and it is thus difficult to maintain high temperature state of the entire high pressure vessel by means of a heat exchange between the high pressure vessel and the pressure medium. As a result, in the high pressure processing device according to Japanese Published examined application No. H7(1995)-61238, it is not possible to efficiently provide a heat retention capability obtained by keeping the high pressure vessel at a high temperature, and there poses a problem that a proper temperature cannot be maintained for a long period in the working zone.

SUMMARY OF THE INVENTION

It is an object of the present invention to provide an isostatic press which can efficiently heat both a pressure medium and a high pressure vessel, thereby processing a workpiece at a stable temperature accuracy.

To attain the above object, the present invention takes the following technical measure.

Namely, the technical measure to solve the above problems is an isostatic press comprising;

a heat insulator that forms a working zone which contains a workpiece;

a high pressure vessel that covers the heat insulator; wherein a pressure medium introducing space which communicates with the working zone, and can introduce a pressure medium is provided between the heat insulator and the high pressure vessel;

a heating unit that heats the high pressure vessel; and a pressure medium supplying device that can supply an interior of the high pressure vessel with the pressure medium, wherein the pressure medium introducing space communicates with the working zone via a communication hole formed on a top portion of the heat insulator; and the pressure medium supplying device communicates with the pressure medium introducing space via a pressure medium introducing opening formed on a bottom portion of the high pressure vessel.

With this configuration, when the pressure medium is introduced into the high pressure vessel, and is pressurized and heated, and the pressure medium is then further introduced by the pressure medium supplying device to apply a pressure to the workpiece, the pressure medium is first introduced into the pressure medium introducing space via the pressure medium introduction opening. Though the temperature of the pressure medium present in the pressure medium introducing space decreases due to the mix of the newly introduced pressure medium, since the pressure medium introduction space is formed between the high pressure vessel heated by the heating unit and the heat insulator, the pressure medium is heated by the heat exchange between the pressure medium and the high pressure vessel with a high heat capacity. Moreover, the temperature of the pressure medium is maintained without a large decrease.

As a result, the one heating unit efficiently heats the high pressure vessel and the pressure medium, and it is thus possible to efficiently increase the temperature and the pressure for the workpiece.

Moreover, since the heat insulator is interposed between the working zone and the pressure medium introducing space, even if a pressure medium at a low temperature is introduced into pressure medium introducing space, there hardly exists a heat exchange between the pressure medium in the working zone and the pressure medium in the pressure medium introducing space. As a result, there is no possibility that the temperature in the working zone rapidly decreases due to the introduction of the pressure medium as described above, and it is thus possible to stabilize the temperature accuracy in the working zone.

Moreover, it is preferable that a pressure medium circulating device, which circulate the pressure medium in the pressure medium introducing space, is connected to the pressure medium introducing space, and the pressure medium circulating device is provided with a heating device, which can heat the pressure medium.

With this configuration, not only is the pressure medium heated by the circulation through the pressure medium circulating device, but also the high pressure vessel is heated by the pressure medium while the heated pressure medium is passing the pressure medium introducing space. Therefore, the high pressure vessel is heated not only by the heating unit from the outside, but also by the pressure medium from the inside, and the high pressure vessel is thus efficiently heated, resulting in a reduction of a startup time of the device, and a reduction in energy used for an ordinary process.

Further, the pressure medium circulating device preferably includes a first pipeline which can introduce the pressure medium heated by the heating device into the pressure medium introducing space, a second pipeline which can introduce the pressure medium into the working zone, and a selector valve which can switch a state where the pressure medium is supplied to one of the pipelines to a state where the pressure medium is supplied to the other one of the pipelines.

With this configuration, it is possible to introduce the heated pressure medium into the working zone thereby efficiently heating not only the high pressure vessel, but also the workpiece in the working zone. Moreover, even if members to be processed are different in material, shape, or the like for every processing cycle, it is possible to increase the temperature accuracy by adjusting the amount of the pressure medium to be introduced into the pressure medium introducing space and the working zone.

With the isostatic press according to the present invention, it is possible to efficiently heat both a pressure medium and a high pressure vessel, thereby processing a workpiece at a stable temperature accuracy.

DESCRIPTION OF THE PREFERRED EMBODIMENTS

A description will now be given of embodiments of the present invention.

First Embodiment

Figure 1:
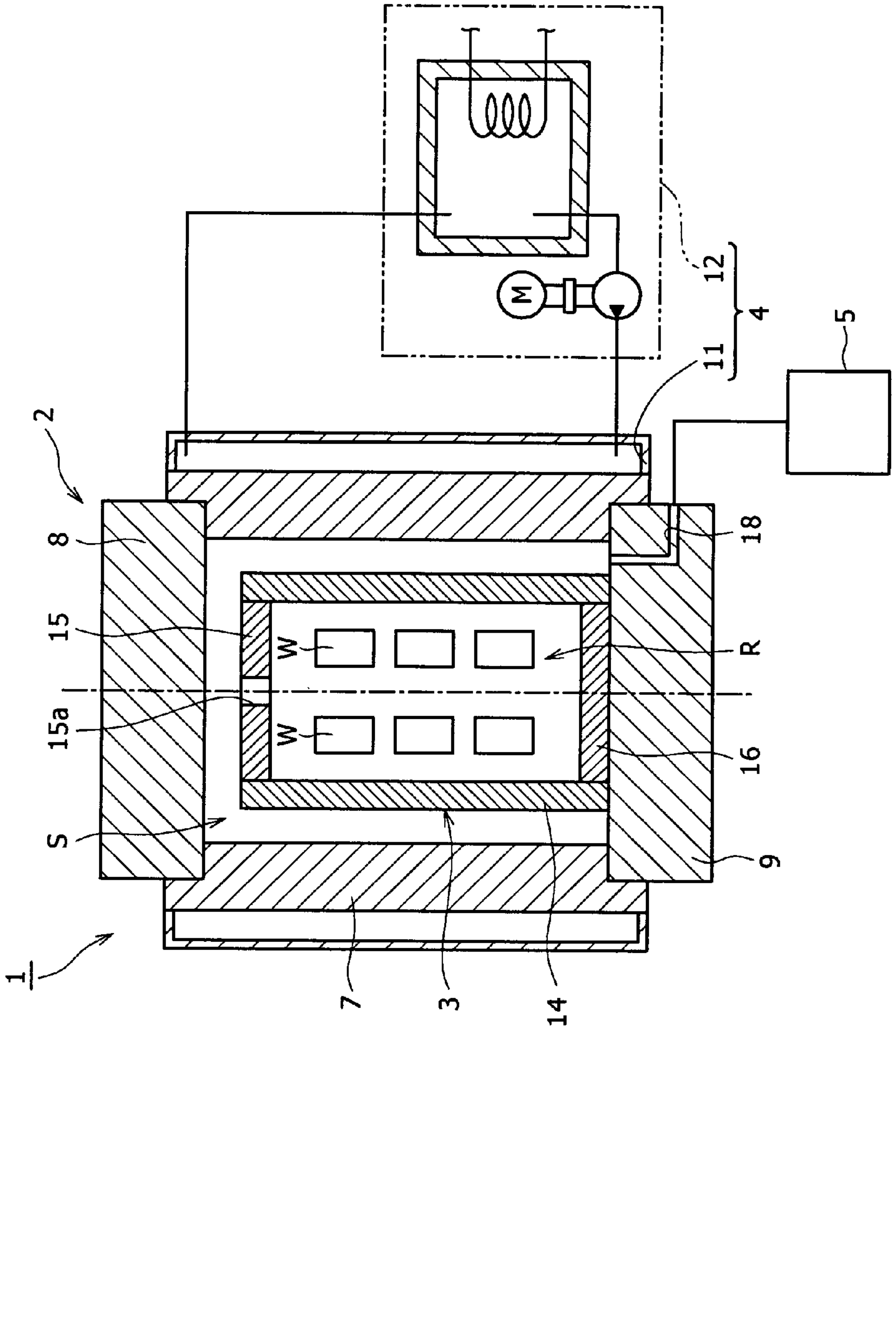
FIG. 1 is a front cross sectional view of a first embodiment of an isostatic press according to the present invention.

An isostatic press 1 according to the present embodiment is used for warm isostatic pressing which carries out a processes in which an isostatic pressure is applied via a pressure medium in a temperature range from 100° C. to 300° C. to a workpiece W. The isostatic press 1 includes a high pressure vessel 2, a heat insulator 3 which is stored within the high pressure vessel 2, a heating unit 4 which heats the high pressure vessel 2, and a pressure medium supplying device 5 which introduces the pressing medium inside the high pressure vessel 2, as shown in FIG. 1.

The high pressure vessel 2 includes a cylindrical vessel 7 which is formed thick, and an upper closure 8 and a lower closure 9 which detachably close respectively top and bottom openings of the vessel 7 in a liquid tight manner. The pressurized container 2 is formed as a hollow column as a whole.

Though upward and downward axial forces are applied respectively to the upper closure 8 and the lower closure 9 by an internal pressure which acts when the pressure medium is supplied inside the high pressure vessel 2, the upper closure 8 and the lower closure 9 are supported by a press frame (not shown).

The heating unit 4 includes a jacket 11 which is provided on an outer periphery of the vessel 7 of the high pressure vessel 2, and a heater 12 which is connected to top and bottom ends of the jacket 11 via pipes. The vessel 7 of the high pressure vessel 2 and the inside of the high pressure vessel 2 are heated by the circulation of a heating medium between the heater 12 and the jacket 11.

A heat insulator 3 includes a cylindrical heat insulating vessel 14, a top heat insulating closure 15 which closes a top opening of the heat insulating vessel 14, and a bottom heat insulating closure 16 which closes a bottom opening of the heat insulating vessel 14. The heat insulator 3 is formed as a hollow column as a whole. The bottom heat insulating closure 16 is placed on a top surface of the lower closure 9 of the high pressure vessel 2.

It should be noted that the top heat insulating closure 15 may be mounted on a bottom surface of the upper closure 8 of the high pressure vessel 2 so as to be inserted along with the upper closure 8 into a top portion of an inside of the vessel 7 of the high pressure vessel 2. Moreover, it is possible to configure a vessel with a bottom which integrates the heat insulating vessel 14 and the bottom heat insulating closure 16 with each other.

With this configuration, a working zone R which contains a workpiece W is formed in a space surrounded by the heat insulator 3. Moreover, the heat insulator 3 is stored in the high pressure vessel 2 while gaps are provided respectively between the heat insulating vessel 14 and the high pressure vessel 2, and between the top heat insulating closure 15 and the upper closure 8 of the high pressure vessel 2, thereby forming a pressure medium introducing space S which can introduce the pressure medium between the heat insulator 3 and the high pressure vessel 2.

A through hole 15*a* is formed at a position through which an axis passes vertically at the center of the working zone R in a portion approximately at the center of the top heat insulating closure 15. The pressure medium introducing spate S is caused to communicate with the working zone R via the through hole 15*a*. It should be noted that it is only necessary to provide the through hole 15*a* on a top portion of the heat insulator 3, and the through hole 15*a* may not be provided on the top heat insulating closure 15. Moreover the shape of the through hole 15*a* is not necessarily round.

Moreover, a pressure medium introducing opening 18 which communicates the a bottom end portion of the pressure medium introducing space S and the pressure medium supplying device 5 with each other is formed on the lower closure 9 of the high pressure vessel 2. The pressure medium supplying device 5 includes a compressor pump which press-feeds the pressure medium at a relatively low temperature to the pressure medium introducing space S, and the like. Though the pressure medium introducing opening 18 is preferably at the bottom end of the pressure medium introducing space S, it is only necessary to provide the pressure medium introducing opening 18 in a bottom portion, and the pressure medium introducing opening 18 may be provided on a side surface of the high pressure vessel 2.

In the present embodiment, water is employed as the pressure medium. A mixture of water and water-soluble oil, or silicon oil also may be used.

The present embodiment is configured as described above. A description will now be given of processing steps using the isostatic press 1 according to the present invention.

In the warm isostatic pressing using the isostatic press 1 according to the present embodiment, the workpiece W is first stored in the working zone R, and a heating and pressurizing step then starts. Heating and pressurizing are not carried out at the same time, and are to be carried out independently in this heating and pressurizing step.

The heating is carried out by circulating the heating medium heated by the heater 12 through the jacket 11.

The pressurizing is carried out by operating the pressure medium supplying device 5, introducing the pressure medium at a high pressure into the pressure medium introducing space S from the pressure medium supply device 5 through the pressure medium introducing opening 18, and flowing the pressure medium from the pressure medium introducing space S into the working zone R inside the heat insulator 3 through the through hole 15*a*.

On this occasion, the pressure medium at a relatively low temperature introduced from the pressure medium supplying device 5 into the high pressure vessel 2 first flows into the bottom end portion of the pressure medium introducing space S. The pressure medium is then heated by heat exchange with the high pressure vessel 2 which has been sufficiently heated by the heating medium in the jacket 11, while the pressure medium rises in the pressure medium introducing space S. The pressure medium then flows into the working zone R through the through hole 15*a*. On this occasion, since the working zone R is formed by the heat insulator 3, heat exchange hardly occurs between the inside and outside of the working zone R via the heat insulator 3, and the temperature state of the working zone R provided inside the heat insulator 3 is not disturbed by the introduction of the pressure medium. Moreover, the pressure medium at the relatively low temperature is sufficiently heated by being mixed with the pressure medium heated to a high temperature while being present in the pressure medium introducing space S, and by exchanging heat with the high pressure vessel 2. As a result, even if the temperature state in the pressure medium introducing space S is disturbed by the introduction of the pressure medium at the relatively low temperature in the high pressure vessel 2, the pressure medium introducing space S will return to a desired temperature state relatively soon.

As a result, even if the pressure medium at the relatively low temperature is press-fed into the high pressure vessel 2 from the pressure medium supplying device 5 in order to further pressurize from a predetermined pressure state, the predetermined temperature state is maintained in the working zone R.

Moreover, the vessel 7 of the high pressure vessel 2 is kept to the high temperature by the heating medium in the jacket 11 and the pressure medium at the high temperature, the high pressure vessel 2 provides a high heat retention capability.

When the working zone R has reached a temperature and pressure state required for the workpiece W after the above step, the heating and pressurizing step is completed, and the processing proceeds to a maintaining step. The temperature and pressure state in the working zone R is maintained to the temperature and pressure state required for the workpiece W for a certain period in the maintaining process. The processing of the workpiece W in the working zone R completes thorough a cooling process subsequently.

According to the present embodiment, though the pressure medium at the relatively low temperature is used for pressurizing, the temperature state is not disturbed by the introduction of the pressure medium in the working zone R. Therefore, the temperature state in the working zone R is extremely stable. Moreover, since both the high pressure vessel 2 and the pressure medium are efficiently heated, the processing of the workpiece W at the stable temperature accuracy is also promoted.

Moreover, not only are the pressure medium and the high pressure vessel 2 efficiently heated via the heating medium in the jacket 11, but also is the vessel 7 maintained at the high temperature by the heating medium and the pressure medium at the high temperature, since the vessel 7 is externally heated by the heating medium and the inside thereof is in contact with the pressure medium at the high temperature, as for the high pressure vessel 2. Thus, high pressure vessel 2 consequently provides high heat retention capability. As a result, the temperature accuracy inside the high pressure vessel 2 containing the working zone R is stable, which also increases the temperature accuracy inside the working zone R.

Moreover, since the pressure medium supplying device 5 introduces the pressure medium at a relatively low temperature, it is not necessary to provide a sealing device withstanding a high pressure and a high temperature, which involves technically difficult, at a connection portion between the pressure medium supplying device 5 and the pressure medium introducing opening 18 and the like. Therefore, a configuration in which a known sealing device is provided at the connection portion sufficiently prevents the pressure medium from leaking, resulting in a simpler device configuration and a reduction in the manufacturing cost.

Second Embodiment

Figure 2:
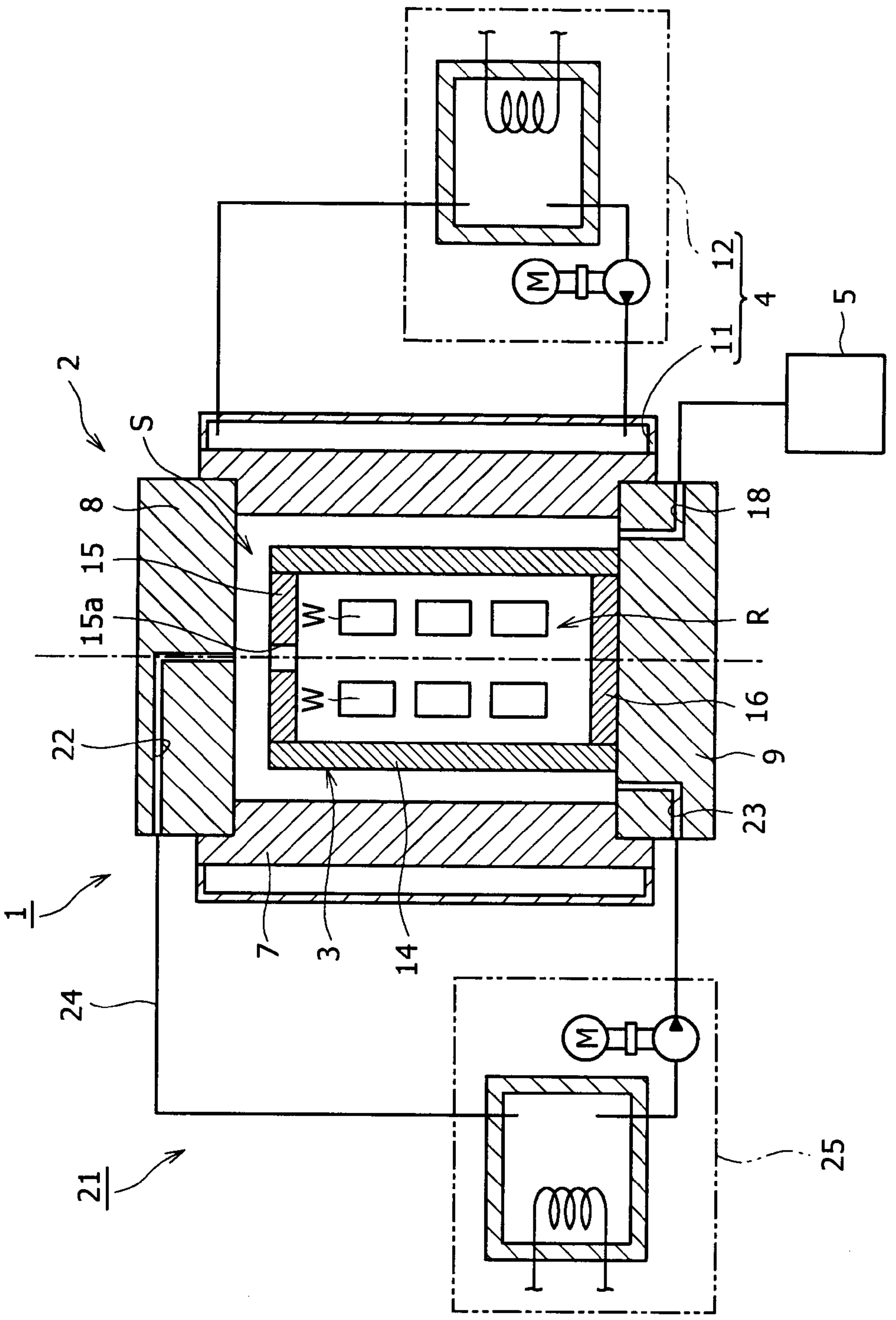
FIG. 2 is a front cross sectional view of a second embodiment of the isostatic press according to the present invention.

According to the present embodiment, the pressure medium introducing space S is connected to a pressure medium circulating device 21 which circulates the pressure medium inside the pressure medium introducing space S as shown in FIG. 2.

The pressure medium circulating device 21 includes a pipeline 24. The pipeline 24 includes a pressure medium outflow pipe 22 which is formed in the upper closure 8, and communicates with the pressure medium introducing space S at a position opposing to the through hole 15*a* in the top heat insulating closure 15, and a pressure medium inflow opening 23 which is formed in the lower closure 9, and communicates with the bottom end portion of the pressure medium introducing space S. A heating device 25 for heating the pressure medium passing the pipeline 24 is provided in the course of the pipeline 24.

According to the present embodiment, the pressure medium is heated by the heating device 25 while the pressure medium in the pressure medium introducing space S is circulated through the pressure medium circulating device 21 during the heating in the heating and pressurizing step. As a result, the pressure medium is maintained at a high temperature.

Moreover, since the pressure medium is heated to a high temperature by the heating device 25, the high pressure vessel 2 is heated from the inside via the pressure medium, resulting in a reduction in the setup time of the press, and an increase in the heat retention capability of the high pressure vessel 2.

Third Embodiment

Figure 3:
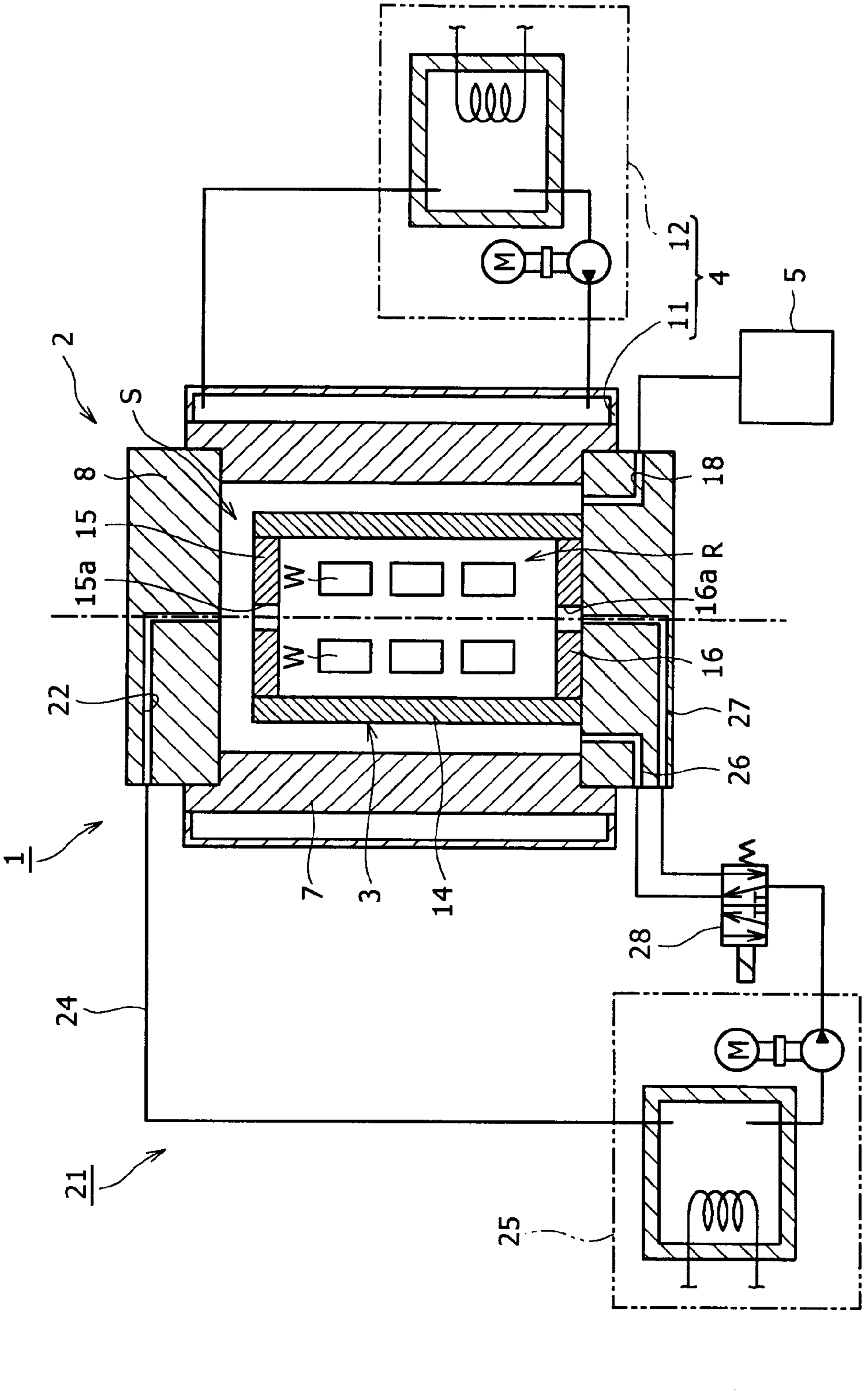
FIG. 3 is a front cross sectional view of a third embodiment of the isostatic press according to the present invention.

As shown in FIG. 3, in the present embodiment, the pressure medium circulating device 21 includes a first pipeline 26 which can introduce the pressure medium heated by the heating device 25 into the pressure medium introducing space S, a second pipeline 27 which can introduce the pressure medium into the working zone R, and a selector valve 28 which can switch a state where the pressure medium is supplied to one of the pipelines 24 to a state where the pressure medium is supplied to the other one of the pipelines 24.

The bottom heat insulating closure 16 includes a through hole 16*a* which passes through from the inside to the outside of the working zone R on the center axis passing vertically at the center of the working zone R at a position corresponding to the through hole 15*a* in the top heat insulating closure 15. The second pipeline 27 communicates with the through hole 16*a*.

According to the present embodiment, it is possible to introduce the pressure medium heated to a high temperature by the heating device 25 into the working zone R without introducing into the pressure medium introducing space S, by operating the selector valve 28 to communicate the heating device 25 and the second pipeline 27 with each other. With this configuration, it is possible to efficiently heat the inside of the working zone R and the workpiece W contained in the working zone R. Since the second pipeline 27 communicates with the through hole 16*a* formed on the axis passing vertically at the center of the working zone R, the pressure medium flowing out into the working zone R from the through hole 16*a* evenly diffuse radially outward in the radial direction. As a result, the temperature state radially outward in the working zone R is not biased by the introduction of the pressure medium at the high temperature.

Moreover, it is possible to supply the pressure medium introducing space S with the pressure medium heated to the high temperature by the heating device 25 as in the second embodiment, by operating the selector valve 28 to communicate the heating device 25 and the first pipeline 26 with each other. As a result, it is possible to reduce the setup time of the press, and to increase the heat retention capability of the high pressure vessel 2.

Though the embodiments of the present invention have been detailed above, the present invention is not limited to the above embodiments. For example, if there is employed a configuration where the jacket 11 is provided on the upper closure 8 and the lower closure 9 of the high pressure vessel 2, and the heating medium is caused to pass through the jacket 11 to heat the covers, it is possible to provide the same effects as these embodiments. Moreover, the pressure medium introducing opening 18, the pressure medium inflow opening 23, the first pipeline 26, and the second pipeline 27 may be provided on the vessel 7 of the high pressure vessel 2 as long as they communicate with the bottom end portion of the pressure medium introducing space S.

What is claimed is:

1. An isostatic press comprising:

a heat insulator that forms a working zone which contains a workpiece, said heat insulator including a communication hole formed through a top portion of said heat insulator;

a high pressure vessel that covers said heat insulator to form a space therebetween, wherein a pressure medium introducing space communicates with said working zone, and can introduce a pressure medium, said pressure medium introducing space is provided in a space between said heat insulator and said high pressure vessel;

a heating unit that heats said high pressure vessel from outside of a body of said high pressure vessel, the heating unit includes a jacket which is provided on an outer periphery of said high pressure vessel, whereby heat from said jacket is transferred to said pressure medium introducing space through the body of said high pressure vessel;

a pressure medium supplying device connected for supplying high pressure medium directly to the pressure medium introducing space, without directly supplying the high pressure medium to the working zone, wherein the pressure medium in said pressure medium introducing space communicates with said working zone by flowing through the communication hole, and said pressure medium supplying device communicates with said pressure medium introducing space via a pressure medium introducing opening formed on a bottom portion of said high pressure vessel.

2. An isostatic press comprising:

a heat insulator that forms a working zone which contains a workpiece;

a high pressure vessel that covers said heat insulator to form a space therebetween, wherein a pressure medium introducing space which communicates with said working zone, and can introduce a pressure mediums is provided in a space between said heat insulator and said high pressure vessel;

a heating unit that heats said high pressure vessel from outside of a body of said high pressure vessel, the heating unit includes a jacket which is provided on an outer periphery of said high pressure vessel, whereby heat from said jacket is transferred to said pressure medium introducing space through the body of said high pressure vessel; and a pressure medium supplying device is configured to directly supply an interior of said high pressure vessel with the pressure medium without directly supplying the pressure medium to the working zone, wherein said pressure medium introducing space communicates with said working zone via a communication hole formed through a top portion of said heat insulator, and said pressure medium supplying device communicates with said pressure medium introducing space via a pressure medium introducing opening formed on a bottom portion of said high pressure vessel;

a pressure medium circulating device that is connected to said pressure medium introducing space, and circulates the pressure medium in said pressure medium introducing space; and a second heating device that is provided in said pressure medium circulating device, and can heat the pressure medium.

3. The isostatic press according to claim 2 wherein said pressure medium circulating device comprises a first pipeline that can introduce the pressure medium heated by said heating device into said pressure medium introducing space, a second pipeline that can introduce the pressure medium into said working zone, and a selector valve that can switch a state where the pressure medium is supplied to one of said pipelines to a state where the pressure medium is supplied to the other one of said pipelines.

* * * * *